Sept. 3, 1957      B. SEID ET AL      2,804,881
HIGH PRESSURE OPERATED RELIEF AND CHECK VALVE
Filed March 29, 1954
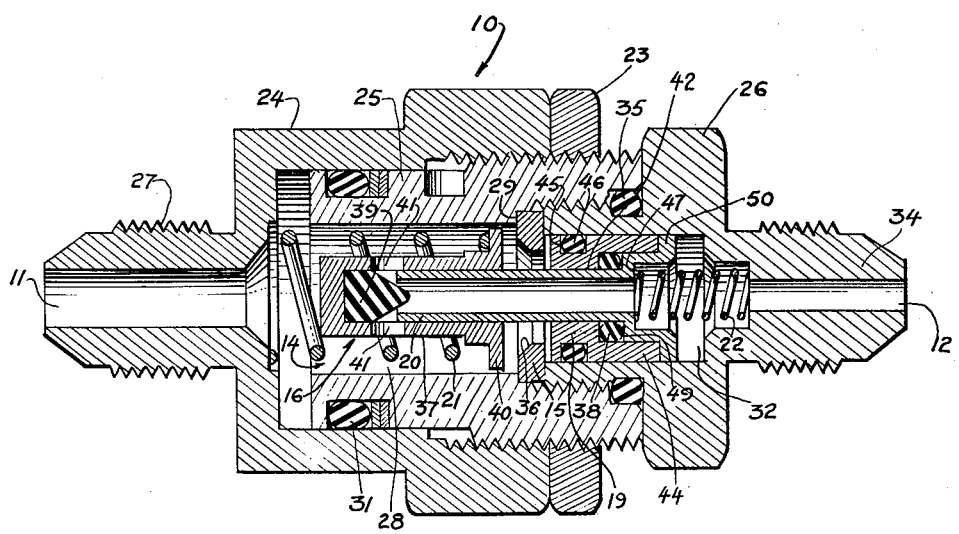
INVENTORS
BERNARD SEID
RALPH L. SHEFFER JR.
BY
ATTORNEY

United States Patent Office

2,804,881
Patented Sept. 3, 1957

2,804,881

HIGH PRESSURE OPERATED RELIEF AND CHECK VALVE

Bernard Seid, Cedar Grove, and Ralph L. Sheffer, Jr., Montclair, N. J., assignors to Specialties Development Corporation, Belleville, N. J., a corporation of New Jersey Application March 29, 1954, Serial No. 419,308

1 Claim. (Cl. 137—493)

This invention relates to valves, and, more particularly, to valves of the floating seat, oppositely acting type for use in high pressure systems wherein the valve is normally maintained closed.

Heretofore, in such systems, normally closed valves which were required to open under the influence of a predetermined pressure, such as check and relief valves, presented a particular disadvantage in that the valve had to be maintained closed by a relatively great force so that it would open only at the desired high pressure. This relatively great force was necessarily continuously exerted, usually by suitable springs, to keep the valve closed even when it was not in use, for example, during long periods of storage, or when the system in which the valve was connected had little or no pressure in it. As a result, it was commonly found that the seats of such valves, which were usually made of a somewhat resilient material such as nylon, had been permanently deformed by reason of the force with which the valve closing member was urged into engagement therewith. Such deformation was particularly noticeable where the valve had been used in high temperature systems and often rendered such valves useless due to leakage and variations in the area upon which pressure acted to effect operation thereof, with consequent non-uniformity of operation, necessitating frequent maintenance and recalibration.

In oppositely acting check and relief valves, it has been proposed to employ floating seat arrangements wherein a stationary surface served as a seat for a movable member which was usually provided with a central bore, the periphery of which seats a second valve member for operation in a direction opposite to the direction of operation of the first valve. In such valves, the first valve member had to be maintained closed by a force greater than that needed to maintain the second valve closed; otherwise the first valve would always be open. Consequently, the foregoing disadvantages were found in such valves, particularly, when used in high pressure systems.

Accordingly, an object of the present invention is to provide an oppositely acting check and relief valve for high pressure systems which is not subject to the foregoing disadvantages.

Another object is to provide such a valve wherein a relatively small force is sufficient to maintain the seat and the valve closing member in engagement when no pressure is in the system or when the valve is not in use.

Another object is to provide such a valve wherein both the check and relief operations permit the flow of fluid through the same valve elements.

A further object is to provide such a valve which is capable of withstanding high temperatures.

A still further object is to provide such a valve which is simple, durable and compact in construction, is readily assembled, is easily maintained and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

The single figure is a longitudinal sectional view of a valve embodying the present invention.

Referring to the drawing in detail, there is shown a valve body 10 having a longitudinal bore 14 connecting with first and second openings 11 and 12 at opposite ends of the bore, said bore having mounted therein a stop 15, seat means 16, a piston 19, a valve member 20, and springs 21 and 22 for respectively urging the seat means and the piston towards the stop.

The body 10 comprises an end adjustment fitting 24, an intermediate fitting 25 and an end fitting 26. The end adjustment fitting 24 is generally cup-shaped and is formed with a nipple 27, providing the opening 11, axially disposed at one end thereof.

The intermediate fitting 25 is formed with a longitudinal bore 28 therethrough having an internal shoulder 29 and is adjustably screw threadedly secured to the fitting 24. A lock nut 23 maintains the fittings 24 and 25 in the desired adjusted relationship.

The end fitting 26 is formed with an axial stepped bore 32 and is secured in one end of the bore 28 of the intermediate fitting. A nipple 34 at the external end thereof provides the opening 12.

Suitable seals are effected between the fittings 24 and 25 and between the fittings 25 and 26 by O-rings 31 and 35, respectively, suitably disposed therebetween.

It should be noted that the bore 14 comprises the aligned bores 28 and 32 of the intermediate fitting 25 and the end fitting 26, respectively.

The stop 15 is a disc formed with a central aperture and having a surface 36 on the left side thereof which tapers inwardly towards the central aperture for the purpose to be described hereinafter. The disc abuts the shoulder 29 in the bore 14 and is retained thereon by the left-hand end of the end fitting 26.

The seat means 16 comprises a poppet member 37 and a seat element 39. The poppet member is tubular in shape, is closed at one end and is formed with a pair of radially outwardly extending guide tabs 40 at the other end adapted to slidably engage the wall of the bore 14. The seat element 39 is conical in contour and is mounted in the poppet member with its base abutting the closed end thereof. A plurality of radial apertures 41 are formed in the poppet member adjacent the conical surface of the seat element for the purpose to be discussed hereinafter.

The piston 19 is disposed in the bore 14 for longitudinal movement therein, which movement is limited in a direction towards the opening 11 by the stop 15, against which the face of the piston is adapted to abut. The piston is formed with a central aperture 42, a skirt portion 44 and an external annular groove 45 for seating an O-ring 46 to effect a seal between the piston and the bore.

The valve member 20 is an elongate tubular member stepped adjacent the right-hand end thereof to form internal and external shoulders 47 and 49, respectively, and having a flange 50 at that end thereof adjacent the shoulders. The flange is disposed in the portion of the bore 14 formed in the end fitting 26 and abuts the end of the skirt portion 44 of the piston 19. The valve member extends through the piston aperture 42, the aperture in the stop 15 and into the tubular poppet member 37 for engagement with the conical surface of the seat element 39. An O-ring 38 encircles the valve member 20 and abuts the shoulder 49 to effect a seal between the valve member and the piston.

The spring 21 bears against the fitting 24, at one end, and against the tabs 40 of the poppet member, at the other end, to urge the poppet member in a direction towards the stop 15.

The spring 22 bears against the fitting 26, at one end, and against the shoulder 47 of the valve member 20, at the other end, to urge the valve member 20 in a direction towards the seat element 39. The springs 21 and 22 are selected so that the spring rate of the spring 21 is larger than that of the spring 22.

The length of the bore 14 on both sides of the stop 15 is such that when the tabs 40 abut the stop, the piston 19 and valve member 20 may move in a direction away from the stop, and also such that when the face of the piston abuts the stop, the poppet member 37 may move in a direction away from the stop.

The valve in accordance with the present invention may be used, for example, as a relief valve in a high pressure pneumatic system by connecting the opening 12 to that portion of the system from which excessive pressure is to be relieved.

In operation, as the pressure in such a system builds up, it exerts a force against the face of the shoulder 47 and the flange 50, as well as an opposite force against the opposite face of the flange 50 and the shoulder 49 and an equal force against the piston 19 which moves towards the stop 15. The total effective force, therefore, tending to drive the valve member 20 in a direction towards the opening 11, is that exerted by the spring 22 together with that exerted by the fluid acting against the annular area of the valve member determined by the thickness of the tubular portion thereof. The fluid pressure in the system also acts against that portion of the seat element 39 which projects into the end of the valve member, so that as the pressure in the system increases, the spring 21 becomes less effective until the seat element and the poppet member 37 move away from the stop 15 and the valve member moves in the same direction, wherefore the valve remains closed while this movement occurs.

The movement of the valve member is arrested when the flange 50 again abuts the piston 19, whereupon, the increasing fluid pressure continues to act upon the seat element 39 until the force created thereby is sufficient to move the seat element away from the valve member against the action of the spring 21. The fluid then passes through the apertures 41, the bore 14 and to the atmosphere through the nipple 11.

When the pressure drops to a point below the relief pressure, the spring 21 serves to close the valve and, if the pressure continues to drop, the poppet member and seat element move towards the stop 15, causing the valve member to move away from the piston until the tabs 40 abut the stop. The piston 19 is urged towards the nipple 34 by the pressure in the bore 14. At this point, the valve is maintained closed by the force exerted by the effective fluid pressure acting upon the valve member together with the force exerted by the spring 22. Should the pressure in the system drop to zero, the tabs 40 will abut the stop 15 under the influence of the spring 21, and the valve member will be maintained in engagement with the seat element solely by the relatively small force exerted by the spring 22.

If it is desired to charge the system through the valve, a source of fluid under pressure may be connected to the nipple 27 and fluid under pressure admitted through the opening 11 therein. The fluid enters the bore 14, passes around the tabs 40 and through the apertured stop 15, the tapered surface of which assures that the tabs do not obstruct the aperture. The fluid bears against the face of the piston, urging it, together with the valve member, in a direction towards the nipple 34 causing the valve member to unseat. Fluid flow communication is therefore established between the openings 11 and 12 through the apertures 41 in the poppet member and the valve member 20. When the system is charged to the desired pressure, the source is disconnected and the valve automatically closes by reason of the pressure in the system and the spring 21 to check the escape of fluid.

It will be noted that when the valve is not in service, or when there is no pressure in the system, the maximum force exerted between the valve member and the seat element is determined solely by the relatively light spring 22. As the pressure in the system increases, the maximum force between the valve member and the seat element occurs only for a short duration when the valve elements shift towards nipple 11. When movement of the piston and the valve member is arrested by the stop, the contact force decreases as the pressure continues to rise, due to the action of the fluid under pressure on the valve seat, until the valve opens in relief. At no time is the contact force as great as the maximum force exerted by the spring 21.

The valve may be adjusted for operation at various pressures by increasing or decreasing the degree of compression of the spring 21. This is accomplished by varying the respective positions of the fittings 24 and 25 and locking them in the desired position by means of the nut 23.

From the foregoing description, it will be seen that the present invention provides an oppositely acting check and relief valve for high pressure systems wherein a relatively small force is sufficient to maintain the valve closed when no pressure is in the system or when the valve is not in use. It will also be seen that the same valve elements are used for both the check and relief operations, that high temperatures are less effective to cause deformation of the valve seat and that the valve itself is simple, compact, of durable construction, is readily assembled, is easily maintained and is reliable in operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

A valve comprising a body having a bore and a first and a second opening for fluid under pressure; a tubular poppet member closed at one end and formed with a plurality of external radial tabs at the other end thereof movable axially in said bore between said openings; a conical seat mounted in said poppet member at the closed end thereof; a piston formed with a stepped aperture providing an annular skirt portion disposed in said bore for axial movement therein; a valve member formed with an annular flange at one end thereof adjacent said second opening adapted to engage said skirt portion of said piston and formed with a tubular section adapted to extend through said aperture and into said poppet member to engage the conical surface of said seat at the other end thereof, said valve member being movable in said bore between said openings and with respect to said seat; spring means in said bore for urging said poppet member in a direction towards said valve member; spring means having a lower spring rate than said first mentioned spring means for urging said valve member towards said seat, said valve member and said piston and said seat being adapted to move in a direction towards said first opening in opposition to said first mentioned spring means under the influence of fluid at a predetermined pressure entering said bore from said second opening; and an annular ring mounted radially in said bore between said piston and said poppet member surrounding said tubular section of said valve member but spaced therefrom and providing oppositely facing surfaces, one of which serves as a stop for said poppet member and the other of which serves as a stop for said piston, said poppet member being free to move in opposition to said first mentioned spring means under the influence of the fluid under pressure entering said bore through said second opening acting on said seat to open said valve when one of said ring surfaces prevents further movement of said piston, and said piston and valve member being adapted to move in a direction away from said ring to open said valve under the influence of fluid under pressure entering said bore through said first opening when said radial tabs engage the other of said ring surfaces, said poppet member having a plurality of apertures adjacent said seat to establish fluid flow communication between said openings through said valve member when said valve is open.

References Cited in the file of this patent
FOREIGN PATENTS 659,079    Great Britain _____ Oct. 17, 1951